(12) United States Patent
Wen et al.

(10) Patent No.: US 7,002,652 B2
(45) Date of Patent: Feb. 21, 2006

(54) TRANSFLECTIVE LIQUID CRYSTAL DISPLAY

(75) Inventors: Chi-Jain Wen, Hsin-Chu (TW); Dai-Liang Ting, Hsin-Chu (TW); Hsiao-Yi Lin, Hsin-Chu (TW); Gwo-Long Lin, Hsin-Chu (TW); I-Wei Wu, Hsin-Chu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/907,053

(22) Filed: Mar. 18, 2005

(65) Prior Publication Data

US 2005/0146657 A1    Jul. 7, 2005

Related U.S. Application Data

(62) Division of application No. 10/250,018, filed on May 29, 2003, now abandoned.

(51) Int. Cl.
*G02F 1/1368*    (2006.01)
*G02F 1/1343*    (2006.01)

(52) U.S. Cl. .......................... 349/114; 349/43; 349/48; 349/144

(58) Field of Classification Search ................. 349/43, 349/48, 54, 113, 114, 143, 106, 139; 345/92; 257/59, 72
See application file for complete search history.

(56) References Cited

U.S. PATENT DOCUMENTS

| | | | |
|---|---|---|---|
| 6,806,929 B1 * | 10/2004 | Chen et al. ................. | 349/114 |
| 2004/0004685 A1 | 1/2004 | Luo | |
| 2004/0004687 A1 * | 1/2004 | Baek .......................... | 349/114 |

* cited by examiner

*Primary Examiner*—Dung T. Nguyen
*Assistant Examiner*—Tai Duong
(74) *Attorney, Agent, or Firm*—Winston Hsu

(57) ABSTRACT

A transflective liquid crystal display (LCD) includes at least a transmission pixel region and at least a reflection pixel region positioned in a pixel region. The transmission region includes at least a transmissive electrode connected to a first switching element. The reflection pixel region includes at least a reflective electrode connected to a second switching element. The transmissive and the reflective electrodes are controlled respectively by independent switching elements.

16 Claims, 17 Drawing Sheets

TRANSFLECTIVE LIQUID CRYSTAL DISPLAY

CROSS REFERENCE TO RELATED APPLICATIONS

This application is a division of application Ser. No. 10/250,018 filed on May 29, 2003, now abandoned.

BACKGROUND OF INVENTION

1. Field of the Invention

The present invention relates to a liquid crystal display (LCD), and more particularly to a transflective LCD.

2. Description of the Prior Art

LCDs have been popularly applied to various IT products such as notebooks, personal digital assistants (PDAs), and cellular phones. Since LCDs are passive luminous devices, an external light source is required. According to different types of external light sources, LCDs are generally classified into reflective LCDs, transmissive LCDs, and transflective LCDs. In a reflective LCD, an external light in front of the panel enters the panel, and is reflected by a reflective layer (such as a aluminum layer) so that users can see what the LCD displays on the screen. In a transmissive LCD, a back light module is installed behind the panel for radiating light, and the radiating light will pass through the panel so that users can see what the LCD displays on the screen. In a transflective LCD, an external light and a back light module are used simultaneously as light sources to illuminate the transflective LCD.

Please refer to FIG. 1. FIG. 1 is a schematic diagram of a pixel region 100 of a prior art transflective LCD, wherein the pixel region 100 is a red color, green color, or blue color pixel region. As shown in FIG. 1, the pixel region 100 comprises a reflection pixel region 110 and a transmission region 120, wherein the reflection pixel region 110 includes a reflective electrode (not shown), and the transmission pixel region 120 comprises a transmissive electrode (not shown). The transmissive electrode (not shown) and the reflective electrode of a pixel region are connected to a pixel driving circuit 101 controlled by a scan line SL1 and a data line DL1, and the luminance of the transmission pixel and the reflective pixel are controlled by the pixel driving circuit 101 simultaneously.

The transmission mode of the prior art transflective LCD uses an internal back light module, while the reflection mode uses an external light. However, in the prior art a pixel driving circuit is used to control both a transmission pixel region and a reflection pixel region in the same pixel region, so only the transmission region or the reflection region can be controlled to its best color display. Therefore the total color display of the transflective LCD is reduced.

SUMMARY OF INVENTION

It is therefore a primary objective of the claimed invention to provide a transflective LCD using two independent switching elements to control the transmission pixel region and the reflection pixel region so that both the transmission mode and the reflection mode can achieve best color display with any light sources.

According to the claimed invention, the transflective LCD comprises a reflection region and a transmission region installed in a pixel region. The reflection region includes a reflective electrode connected to a first switching element, and the transmission region comprises a transmissive electrode connected to a second switching element, wherein the first switching element and the second switching element respectively control the function of reflection mode and transmission mode.

It is an advantage of the claimed invention that the best color display of the transflective LCD can be achieved because the luminance of the reflection region and the transmission region are controlled separately by the first switching element and the second switching element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
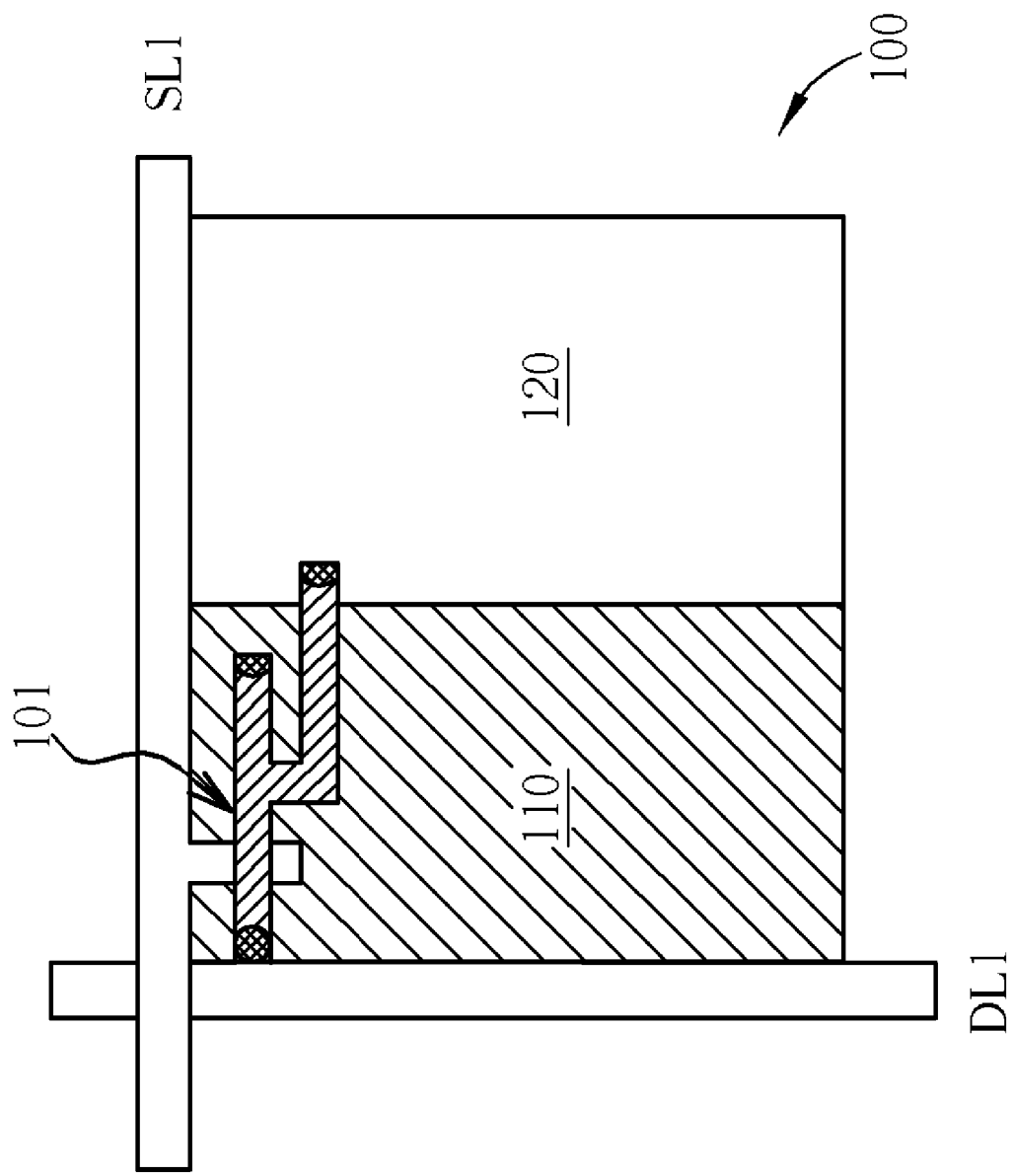
FIG. 1 is a schematic diagram of a pixel region of a prior art transflective LCD.
Figure 2:
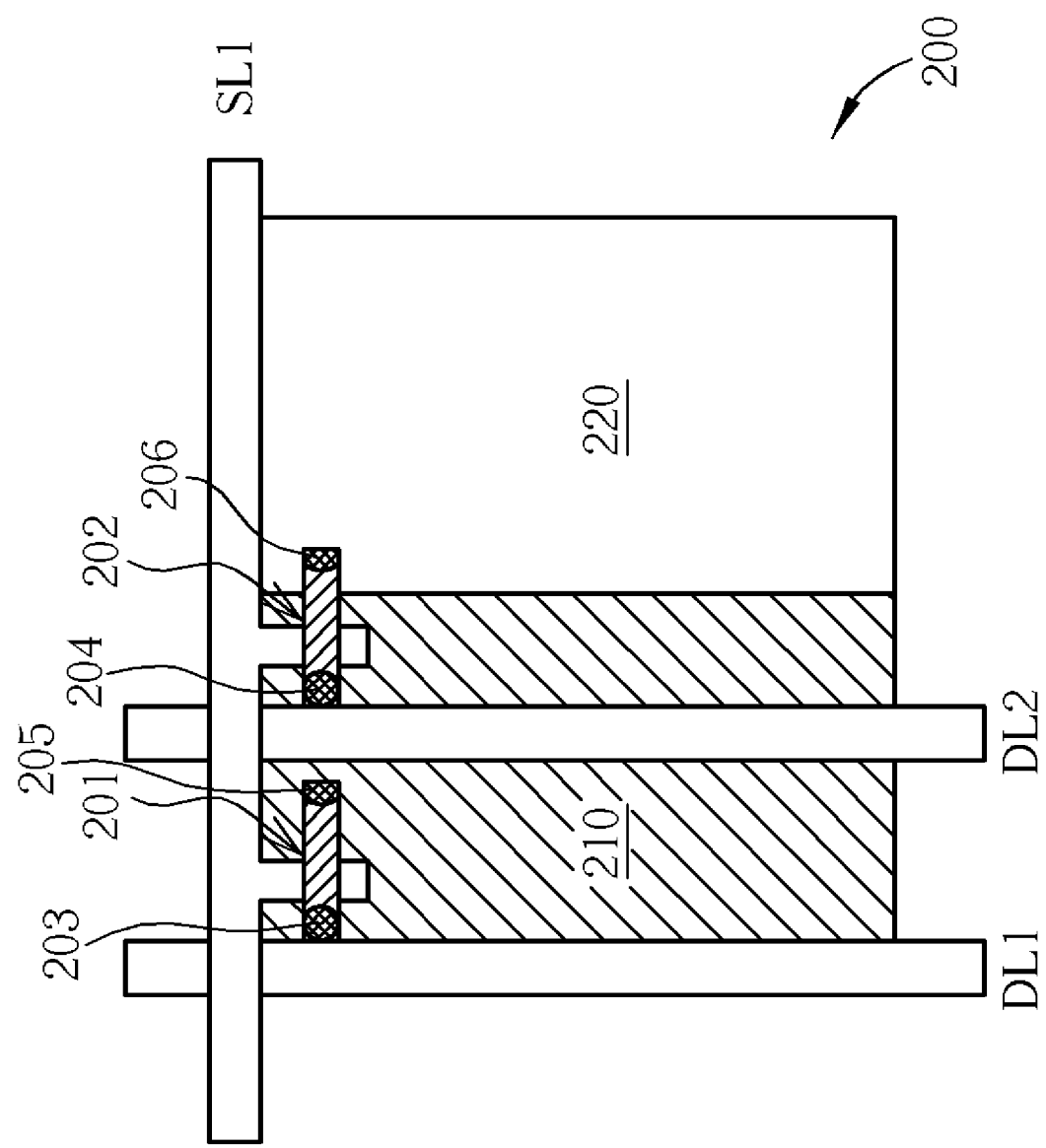
FIG. 2 to FIG. 5 are schematic diagrams of a pixel region of a transflective LCD along the radiation direction of a back light module in the first embodiment of the present invention.
Figure 3:
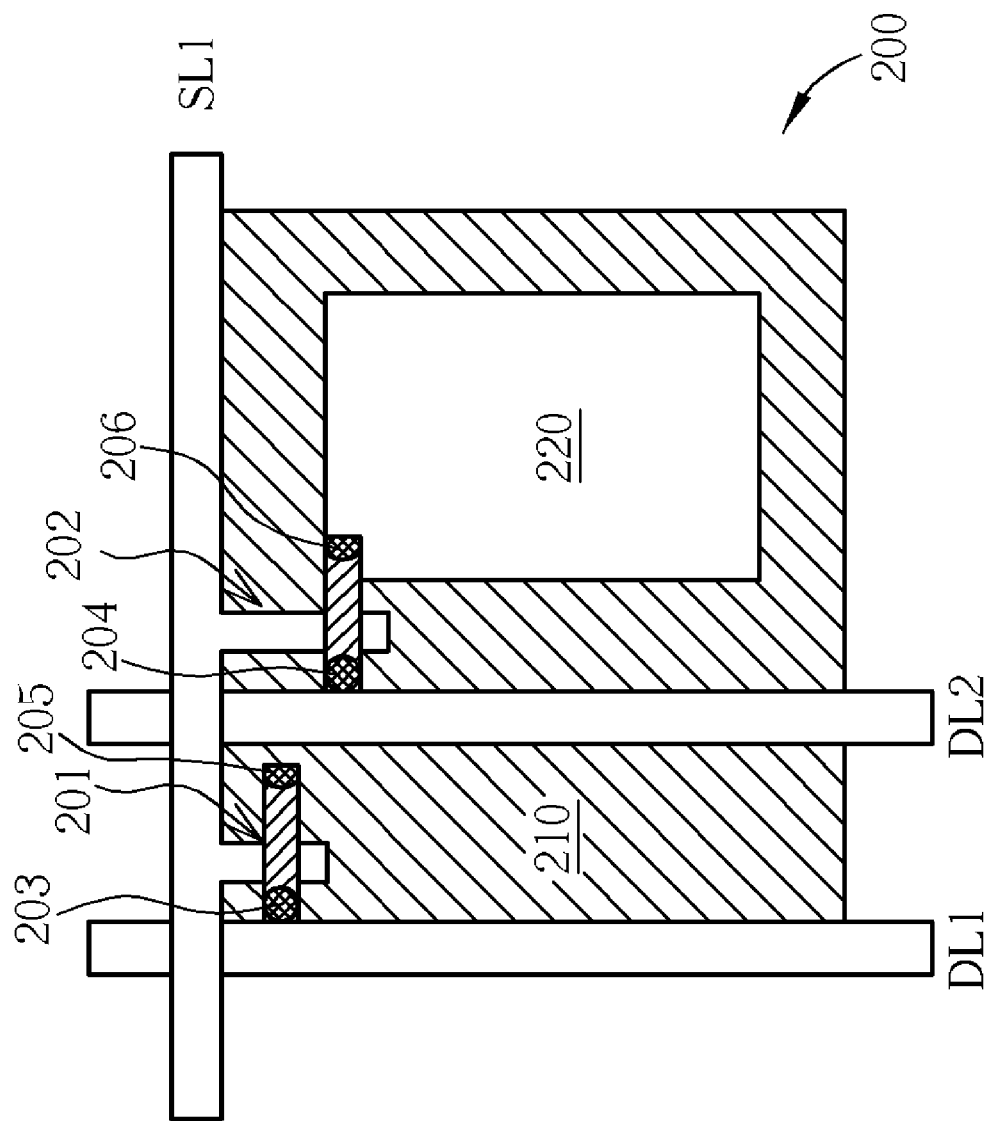
Figure 4:
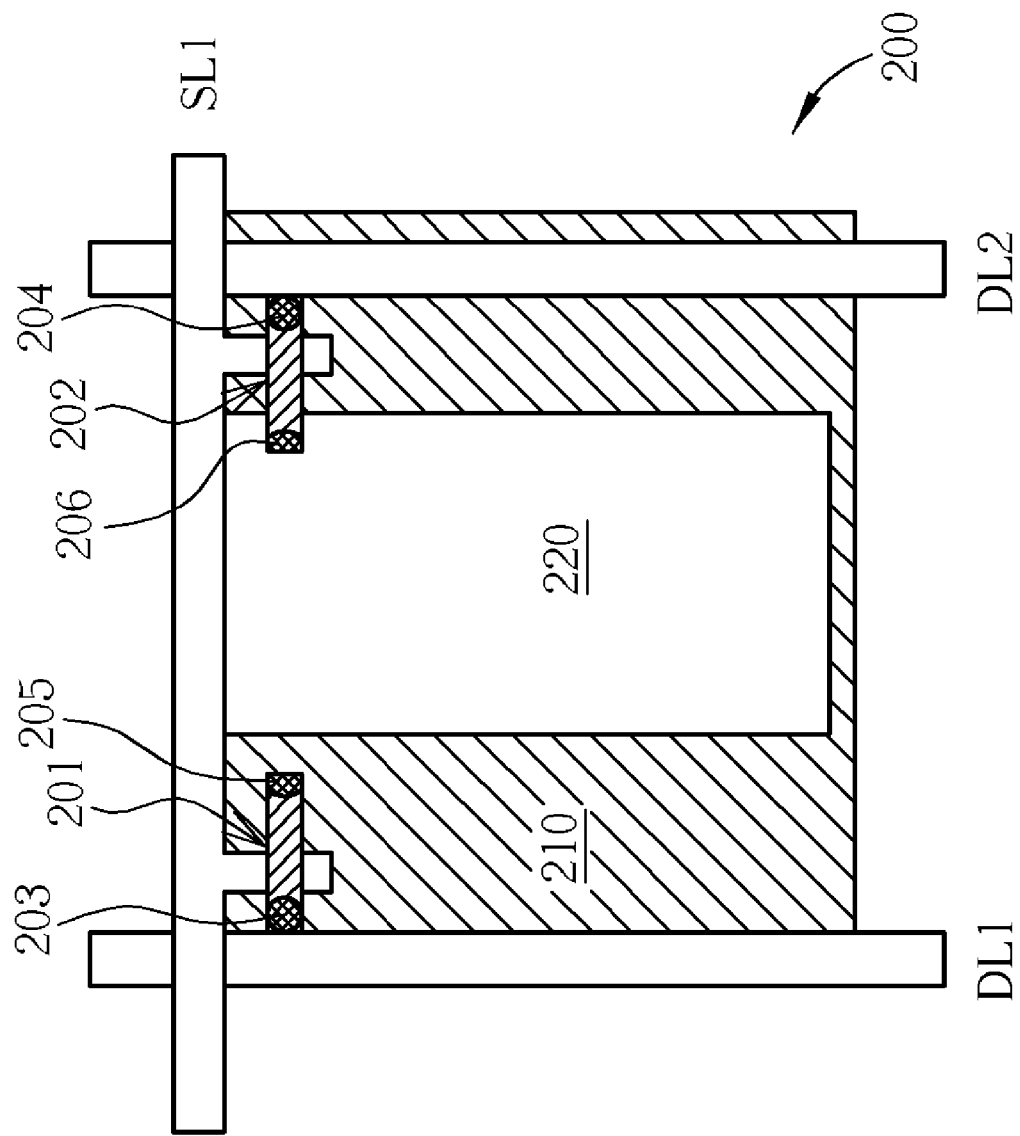
Figure 5:
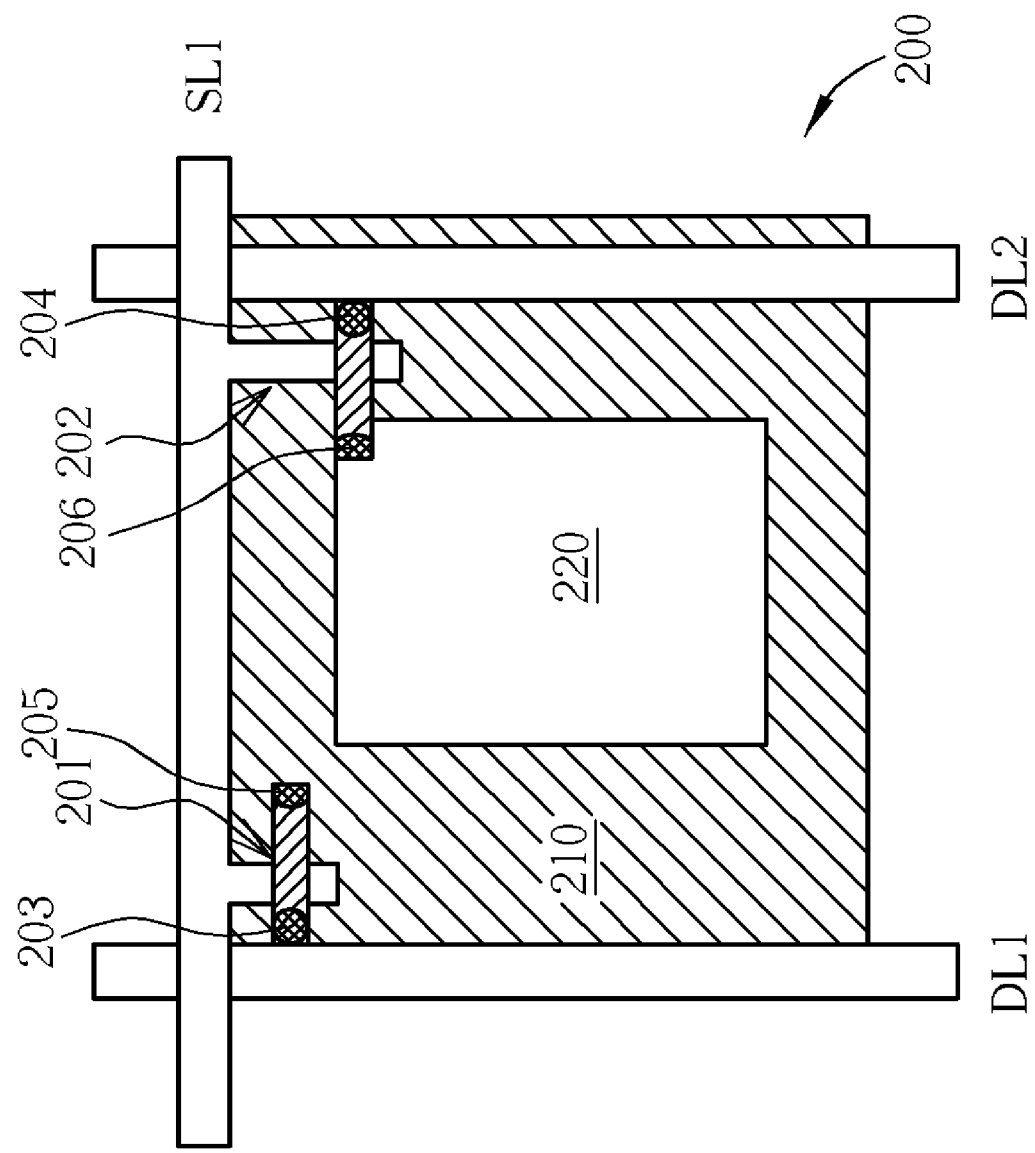

Please refer to FIG. 2. FIG. 2 is a schematic diagram of a pixel region 200 of a transflective LCD along the radiation direction of a back light module in the first embodiment of the present invention, wherein the pixel region 200 is a red color pixel region, a green color pixel region, or a blue color pixel region. As shown in FIG. 2, the pixel region 200 includes a reflection region 210 and a transmission region 220, the luminance of the reflection region 210 is controlled by a first switching element 201, and the luminance of the transmission region 220 is controlled by a second switching element 202. The switching elements 201 and 202 can be driving circuits sharing a scan line SL1, connect to data lines DL1 and DL2 by contact holes 203 and 204, and receive image data signals from data lines DL1 and DL2 respectively. Furthermore, the first switching element 201 is connected to a reflective electrode (not shown) by a contact hole 205 for controlling the luminance of the reflection region 210, and the second switching element 202 is connected to a transmissive electrode (not shown) by a contact hole 206 for controlling the luminance of the transmission region 220. In this embodiment of the present invention, the data line DL1, DL2 and the switching element 201, 202 are located below the reflection region 210 for not affecting the aperture ratio. It is worth noticing that the relative location and ratio of the reflection pixel region and the transmission pixel region can be modified according to circuit designs as shown in FIG. 3, FIG. 4, and FIG. 5.

Figure 6:
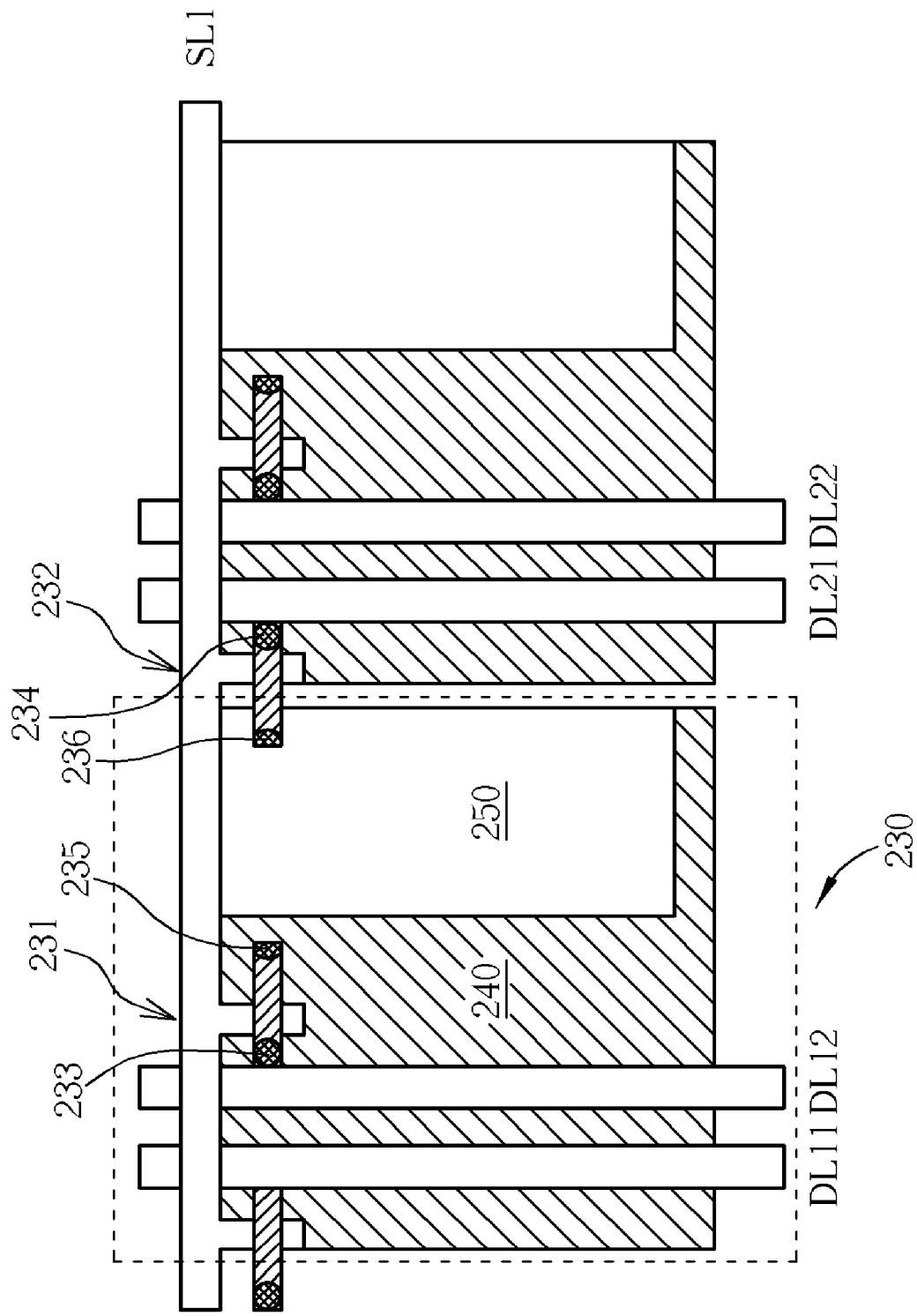
FIG. 6 is a schematic diagram of a pixel region of a transflective LCD along the radiation direction of a back light module in the second embodiment of the present invention.

Please refer to FIG. 6. FIG. 6 is a schematic diagram of a pixel region 230 of a transflective LCD along the radiation direction of a back light module in the second embodiment of the present invention, wherein the pixel region 230 is a red color pixel region, a green color pixel region, or a blue color pixel region. As shown in FIG. 6, the pixel region 230 includes a reflection region 240 and a transmission region 250, the luminance of the reflection region 230 is controlled by a first switching element 231, and the luminance of the transmission region 250 is controlled by a second switching element 232. The switching elements 231 and 232 are driving circuits sharing a scan line SL1, connect to data lines DL12 and DL21 by contact holes 233 and 234, and receive image data signals from data lines DL12 and DL21 respectively. Furthermore, the first switching element 231 is connected to a reflective electrode (not shown) by a contact hole 235 for controlling the luminance of the reflection region 240, and the second switching element 232 is connected to a transmissive electrode (not shown) by a contact hole 236 for controlling the luminance of the transmission region 250. In this embodiment of the present invention, the data line DL12 and the first switching element 231 are located below the reflection region 240, while the data line DL21 and the second switching element 232 are located below a reflection pixel region of a neighboring pixel region for not affecting the aperture ratio.

Figure 7:
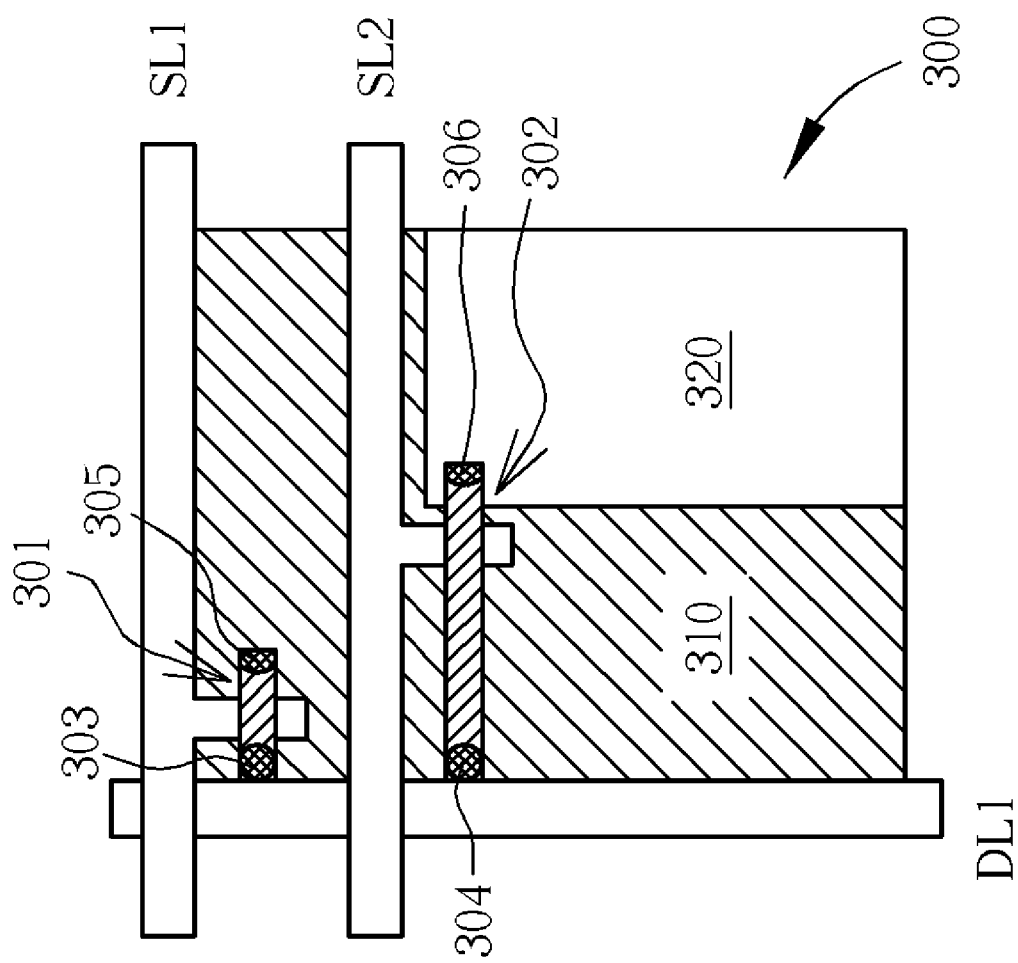
FIG. 7 to FIG. 10 are schematic diagrams of a pixel region of a transflective LCD along the radiation direction of a back light module in the third embodiment of the present invention.
Figure 8:
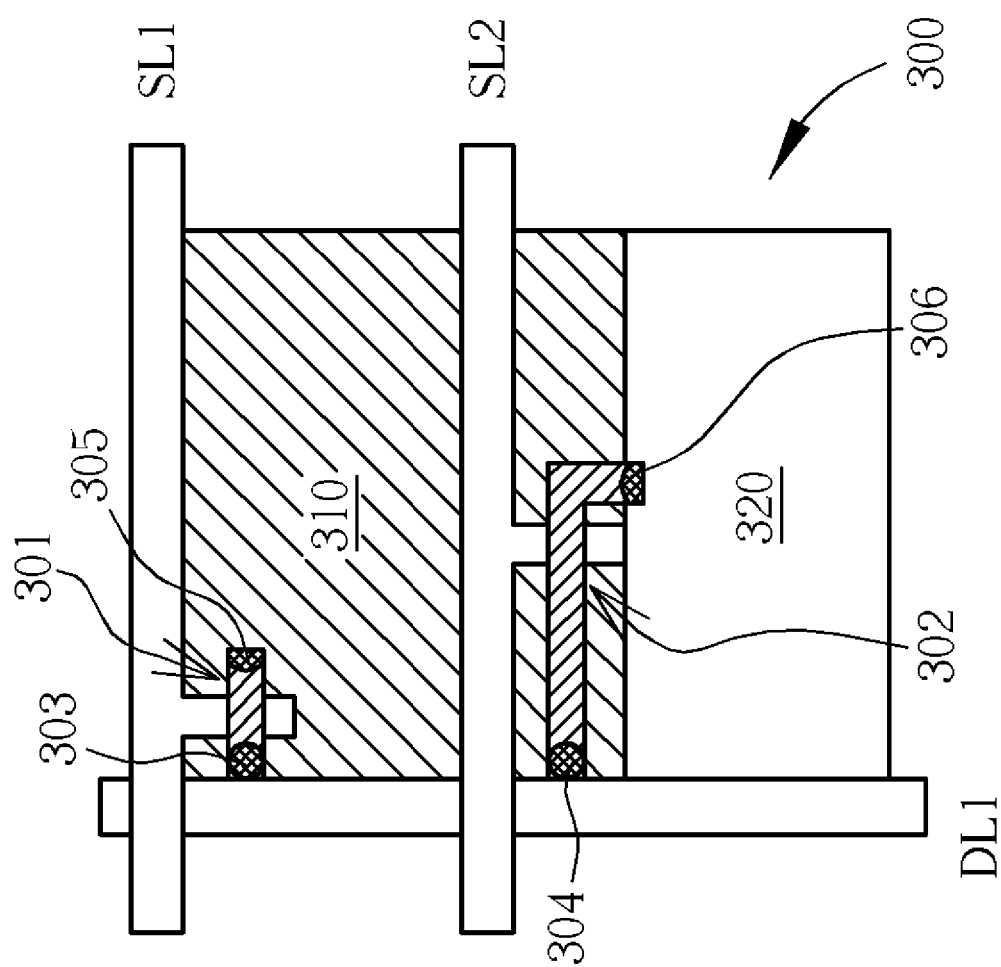
Figure 9:
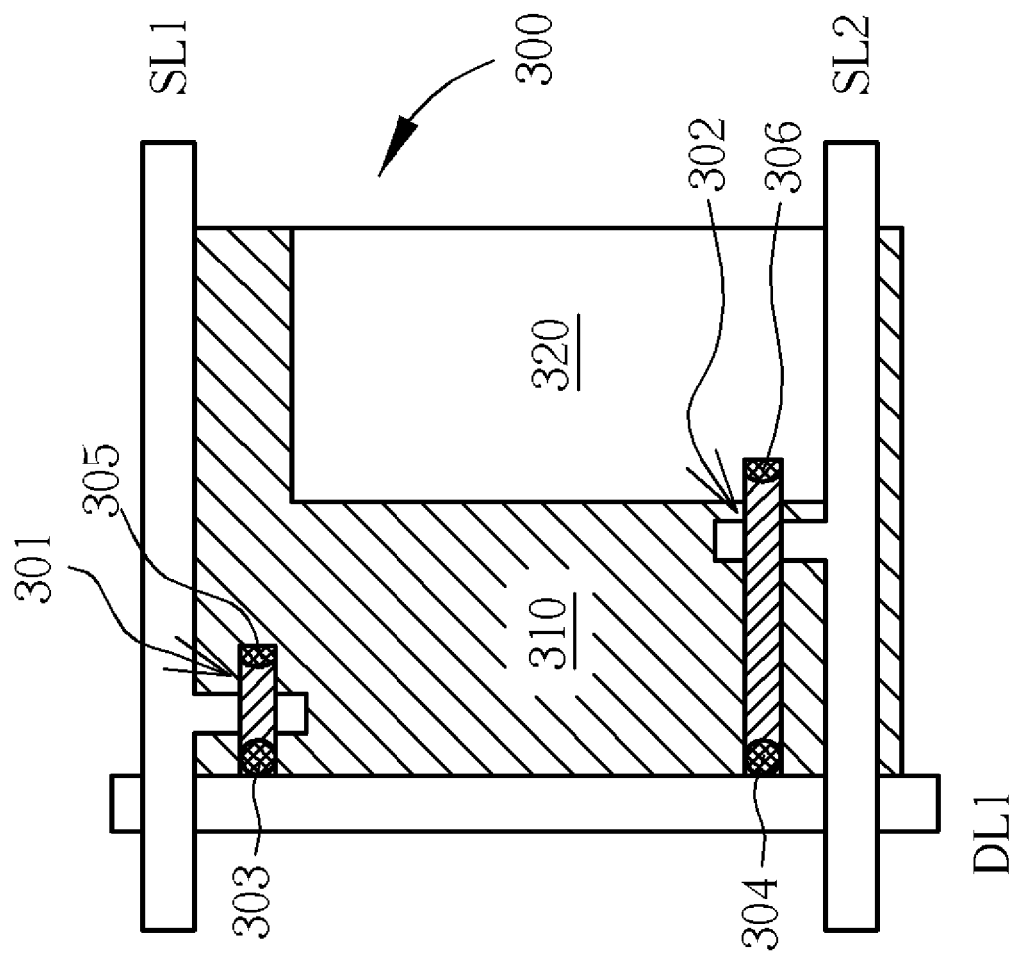
Figure 10:
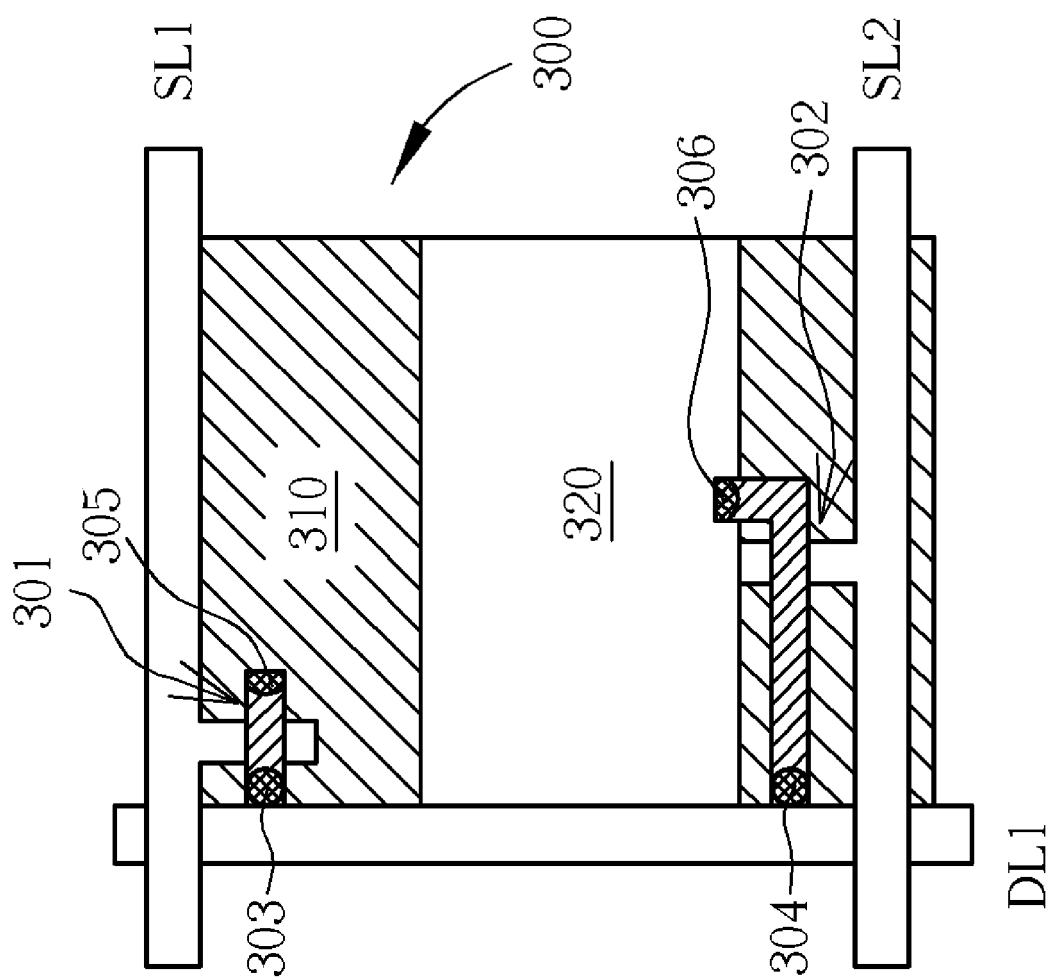

Please refer to FIG. 7. FIG. 7 is a schematic diagram of a pixel region 300 of a transflective LCD along the radiation direction of a back light module in the third embodiment of the present invention, wherein the pixel region 300 is a red color pixel region, a green color pixel region, or a blue color pixel region. As shown in FIG. 7, the pixel region 300 includes a reflection region 310 and a transmission region 320, the luminance of the reflection region 310 is controlled by a first switching element 301, and the luminance of the transmission region 320 is controlled by a second switching element 302. The switching elements 301 and 302 are respectively connected to a data line DL1 by contact holes 303 and 304. Furthermore, the first switching element 301 is connected to a reflective electrode (not shown) by a contact hole 305, and the reflective electrode (not shown) receives a signal from the scan line SL1 to switch the reflection region 310. The second switching element 302 is connected to a transmissive electrode (not shown) by a contact hole 306, and the transmissive electrode (not shown) receives a signal from the scan line SL2 to switch the transmission region 320. In this embodiment of the present invention, the scan lines SL1, SL2 and the switching elements 301, 302 are located below the reflection region 310 for not affecting the aperture ratio. It is worth noticing that the relative location and ratio of the reflection pixel region and the transmission pixel region can be modified according to circuit designs as shown in FIG. 8, FIG. 9, and FIG. 10.

Figure 11:
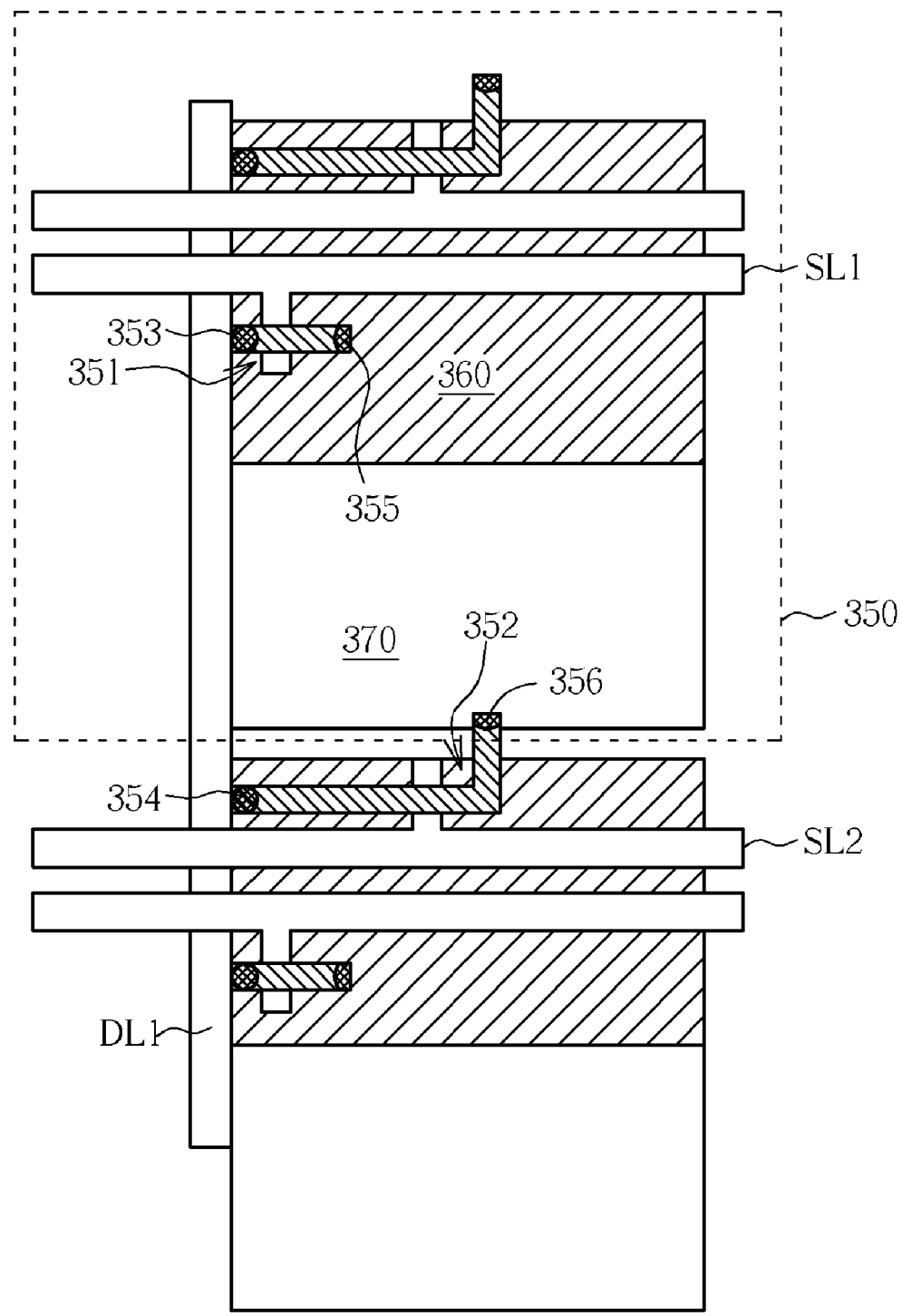
FIG. 11 is a schematic diagram of a pixel region of a transflective LCD along the radiation direction of a back light module in the fourth embodiment of the present invention.

Please refer to FIG. 11. FIG. 11 is a schematic diagram of a pixel region 350 of a transflective LCD along the radiation direction of a back light module in the fourth embodiment of the present invention, wherein the pixel region 350 is a red color pixel region, a green color pixel region, or a blue color pixel region. As shown in FIG. 11, the pixel region 350 includes a reflection region 360 and a transmission region 370, the luminance of the reflection region 360 is controlled by a first switching element 351, and the luminance of the transmission region 370 is controlled by a second switching element 352. The switching elements 351 and 352 are respectively connected to a data line DL1 by contact holes 353 and 354. Furthermore, the first switching element 351 is connected to a reflective electrode (not shown) by a contact hole 355, and the reflective electrode (not shown) receives a signal from the scan line SL1 to switch the reflection region 360. The second switching element 352 is connected to a transmissive electrode (not shown) by a contact hole 356, and the transmissive electrode (not shown) receives a signal from the scan line SL2 to switch the transmission region 370. In this embodiment of the present invention, the scan lines SL1 and the first switching element 351 are located below the reflection region 360, while the scan line SL2 and the second switching element 352 are located below a reflection pixel region of a neighboring pixel region for not affecting the aperture ratio.

Figure 12:
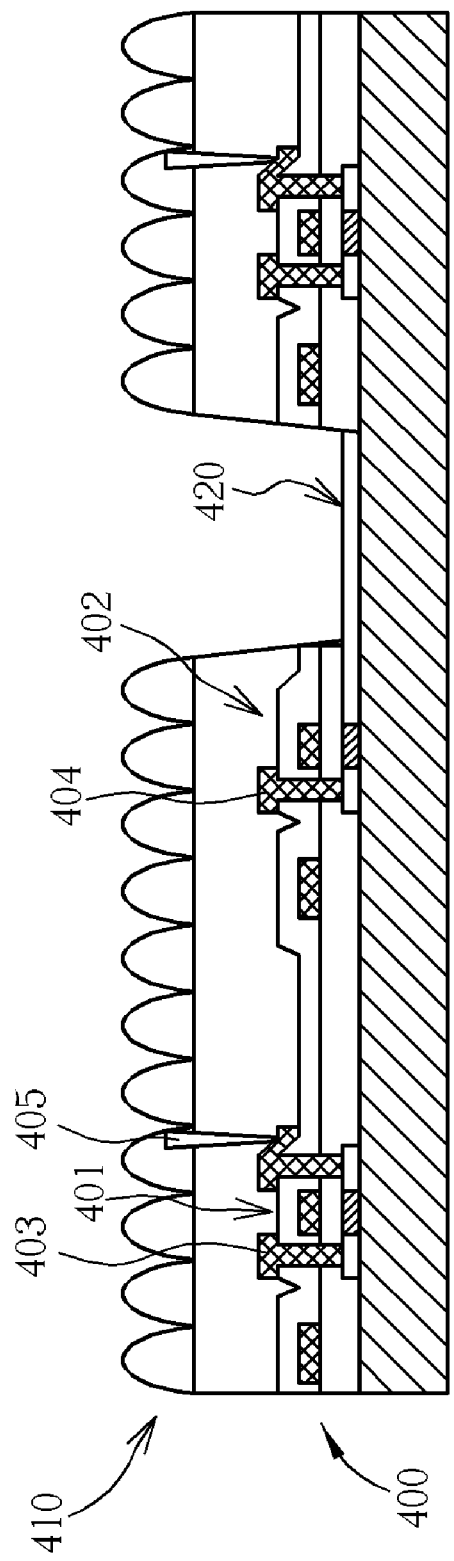
FIG. 12 to FIG. 17 are cross-section diagrams of a transflective LCD of the present invention.
Figure 13:
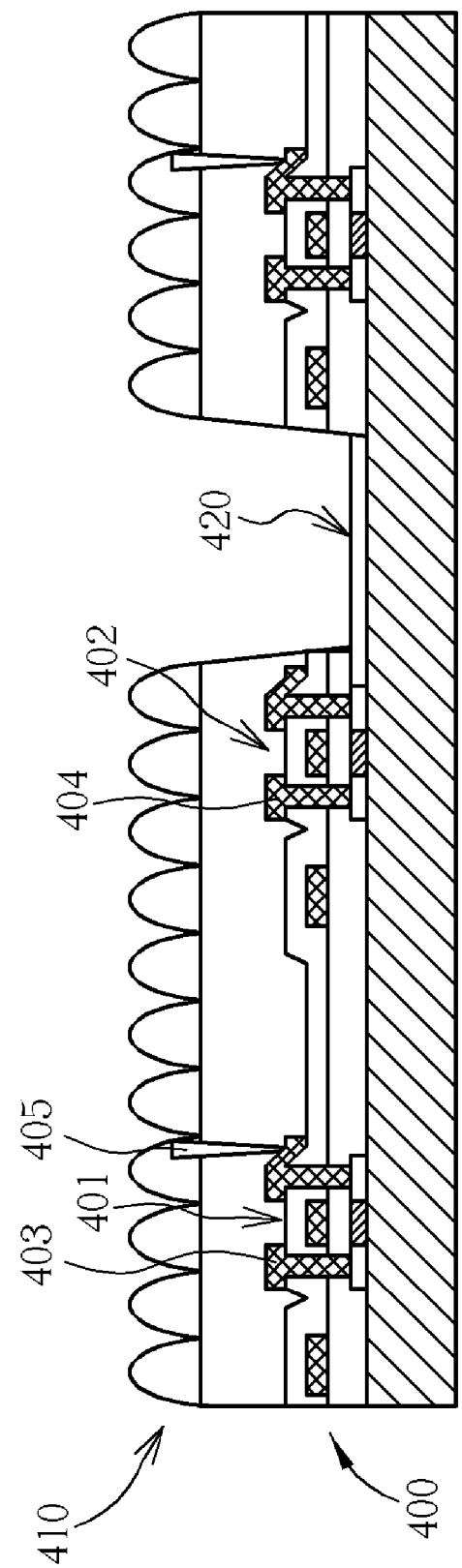
Figure 14:
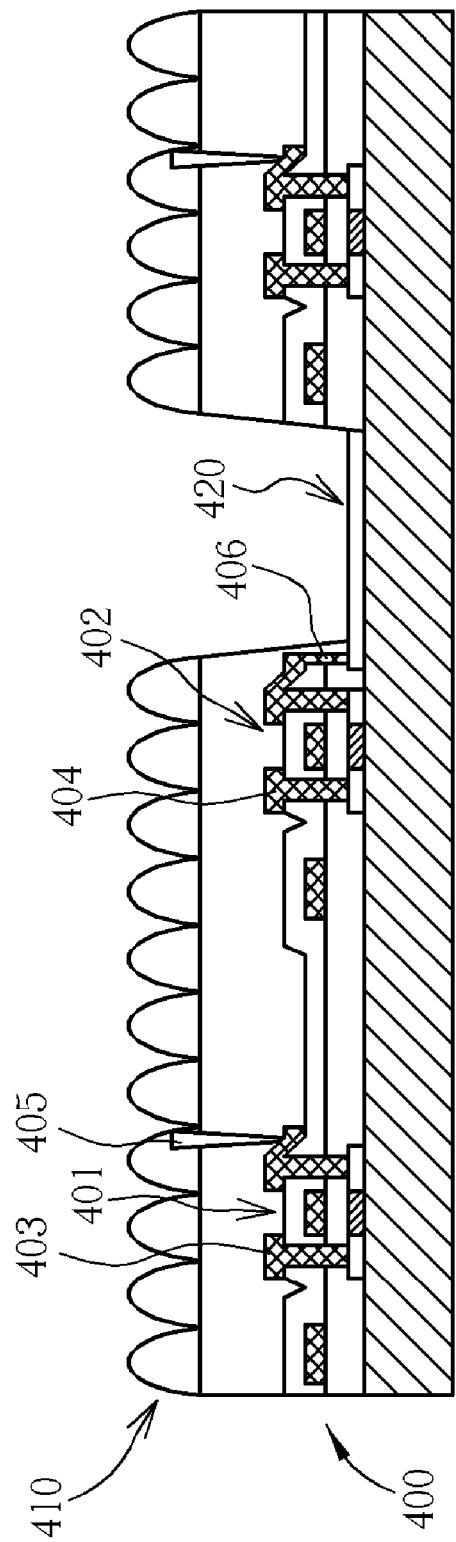
Figure 15:
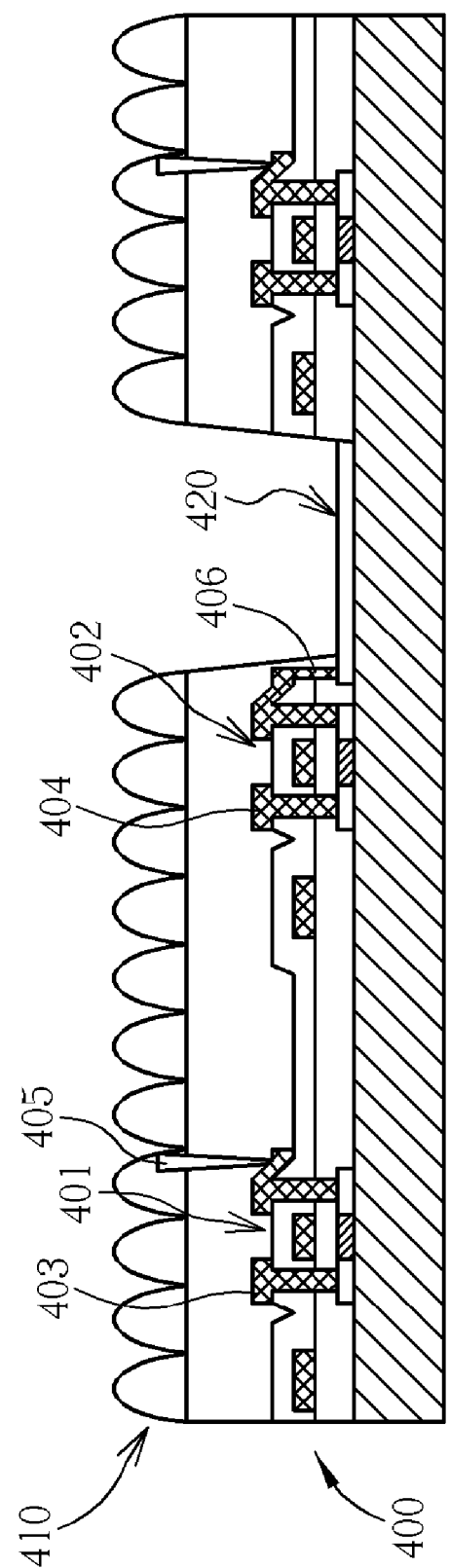
Figure 16:
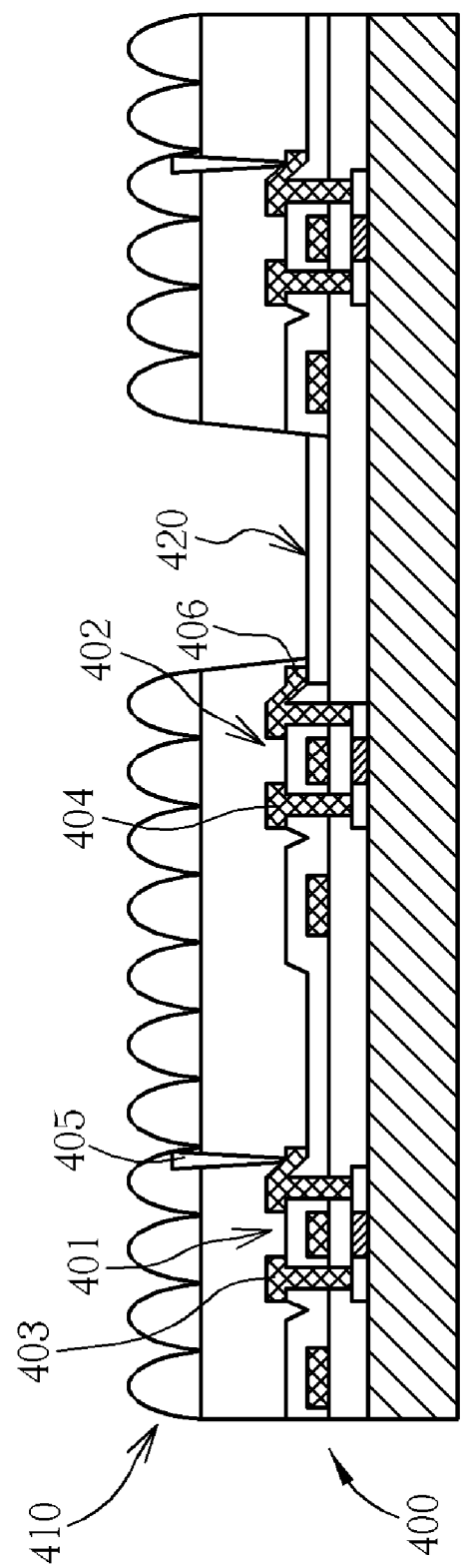
Figure 17:
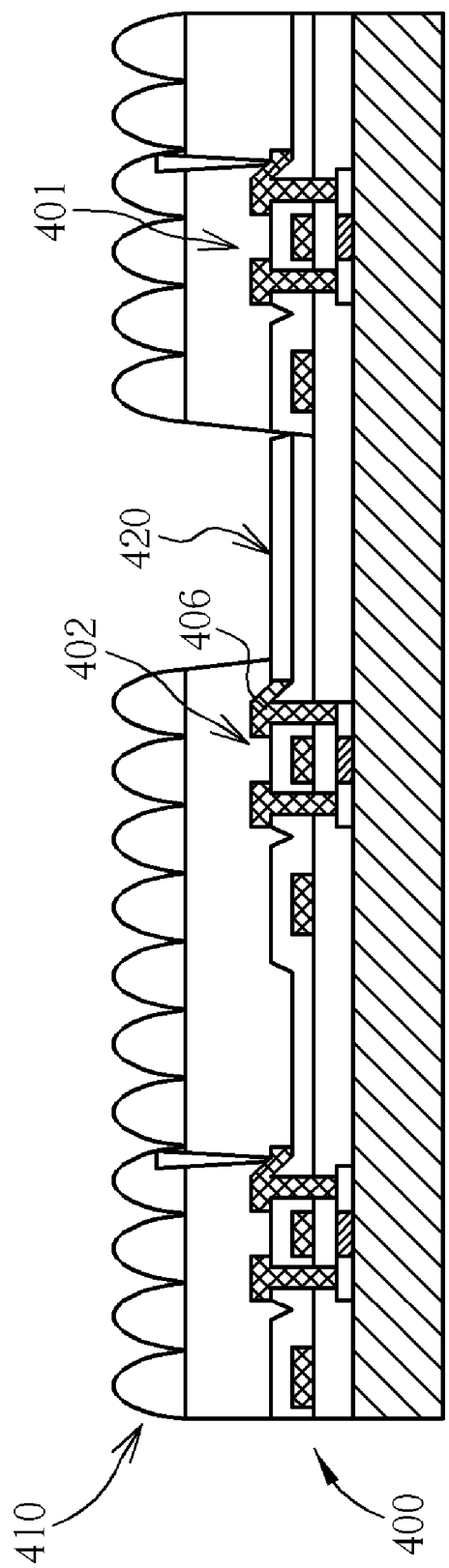

All embodiments of the present invention can be modified as follows. Please refer to FIG. 12 to FIG. 17. FIG. 12 to FIG. 17 are cross-section diagrams of a transflective LCD 400 of the present invention. As shown in FIG. 12 to FIG. 14, the transflective LCD 400 comprises a reflective electrode 410, a transmissive electrode 420, a first switching element 401, and a second switching element 402. The first switching element 401 is connected to a data line by a via hole 403 and is connected to the reflective electrode 410 by a via hole 405, and the second switching element 402 is connected to a data line by a via hole 404. The material of the transmissive electrode 420 can be doped or non-doped polysilicon, or doped or non-doped amorphous silicon. Furthermore, the transmissive electrode 420 can be connected directly to an active layer (source/drain) of the second switching element 402 as shown in FIG. 12 and FIG. 13, or the transmissive electrode 420 can be connected to the active layer of the second switching element 402 by the via hole 406 as shown in FIG. 14. Additionally, the transmissive electrode 420 can be an ITO or an IZO material, and is connected to the second switching element 402 by a via hole 406, wherein the location of the transmissive electrode 420 can be modified as shown in FIG. 15 to FIG. 17. As shown in FIG. 15, the transmissive electrode 420 is located on the bottom layer of the second switching element 402. As shown in FIG. 16, the transmissive electrode 420 and the scan line are located in the same layer. As shown in FIG. 17, the transmissive electrode 420 and the data line are located in the same layer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transflective liquid crystal display (LCD) including at least a reflection region and a transmission region positioned in a pixel region of the transflective liquid crystal display, wherein the reflection region includes at least a reflective electrode connected to a first switching element, and the transmission region includes at least a transmissive electrode connected to a second switching element, the first switching element and the second switching element are connected to the same data line and are respectively connected to a first scan line and a second scan line that are not electrically connected to each other, and the transmissive electrode is located in a bottom layer of the second switching element.

2. The transflective LCD of claim 1, wherein the pixel region is a red color pixel region.

3. The transflective LCD of claim 1, wherein the pixel region is a green color pixel region.

4. The transflective LCD of claim 1, wherein the pixel region is a blue color pixel region.

5. The transflective LCD of claim 1, wherein the first switching element is used to control a reflection mode of the transflective LCD, and the second switching element is used to control a transmission mode of the transflective LCD.

6. The transflective LCD of claim 5, wherein the reflection mode and the transmission mode are operated individually or cooperatively to achieve best display effect.

7. The transflective LCD of claim 1, wherein the second switching element is located under the reflective electrode to avoid affecting the aperture ratio of the transflective LCD.

8. The transflective LCD of claim 1, wherein the transmissive electrode is connected to an active layer of the second switching element.

9. A transflective liquid crystal display (LCD) including at least a reflection region and a transmission region positioned in a pixel region of the transflective liquid crystal display, wherein the reflection region includes at least a reflective electrode connected to a first switching element, and the transmission region includes, at least a transmissive electrode connected to a second switching element, the first switching element and the second switching element are connected to the same data line and are respectively connected to a first scan line and a second scan line that are not electrically connected to each other, and the transmissive electrode, the first scan line, and the second scan line are located in the same layer.

10. The transflective LCD of claim 9, wherein the pixel region is a red color pixel region.

11. The transflective LCD of claim 9, wherein the pixel region is a green color pixel region.

12. The transflective LCD of claim 9, wherein the pixel region is a blue color pixel region.

13. The transflective LCD of claim 9, wherein the first switching element is used to control a reflection mode of the transflective LCD, and the second switching element is used to control a transmission mode of the transflective LCD.

14. The transflective LCD of claim 13, wherein the reflection mode and the transmission mode are operated individually or cooperatively to achieve best display effect.

15. The transflective LCD of claim 9, wherein the second switching element is located under the reflective electrode to avoid affecting the aperture ratio of the transflective LCD.

16. The transflective LCD of claim 9, wherein the transmissive electrode is connected to an active layer of the second switching element.

* * * * *